(12) United States Patent
Krein et al.

(10) Patent No.: US 8,325,499 B2
(45) Date of Patent: *Dec. 4, 2012

(54) METHODS FOR MINIMIZING DOUBLE-FREQUENCY RIPPLE POWER IN SINGLE-PHASE POWER CONDITIONERS

(75) Inventors: Philip T. Krein, Champaign, IL (US); Robert S. Balog, Jr., College Station, TX (US)

(73) Assignee: SolarBridge Technologies, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,527

(22) Filed: Aug. 23, 2011

(65) Prior Publication Data

US 2011/0305050 A1    Dec. 15, 2011

Related U.S. Application Data

(63) Continuation of application No. 12/794,034, filed on Jun. 4, 2010, now Pat. No. 8,004,865, which is a continuation of application No. 11/871,015, filed on Oct. 11, 2007, now Pat. No. 7,755,916.

(51) Int. Cl.
    *H02J 1/02* (2006.01)
(52) U.S. Cl. ........................................ 363/39
(58) Field of Classification Search ............... 363/39–41, 363/44–46
    See application file for complete search history.

(56) References Cited

U.S. PATENT DOCUMENTS

| | | | |
|---|---|---|---|
| 3,670,230 A | 6/1972 | Rooney et al. | |
| 4,114,048 A | 9/1978 | Hull | |
| 4,217,633 A | 8/1980 | Evans | |
| 4,277,692 A | 7/1981 | Small | |
| 4,287,465 A | 9/1981 | Godard et al. | |
| 4,651,265 A | 3/1987 | Stacey et al. | |

(Continued)

FOREIGN PATENT DOCUMENTS

CA    2353422 C    3/2004

(Continued)

OTHER PUBLICATIONS

Ando et al., "Development of Single Phase UPS Having AC Chopper and Active Filter Ability," IEEE International Conference on Industrial Technology, 10.1109/ICIT.2006.372445, pp. 1498-1503, 2006.

(Continued)

*Primary Examiner* — Matthew Nguyen
(74) *Attorney, Agent, or Firm* — Barnes & Thornburg LLP

(57) ABSTRACT

A method is provided for minimizing a double-frequency ripple power exchanged between a load and an energy source, the energy source delivering electrical power to the load through a single-phase power conditioner, and the power conditioner being coupled to an energy storage device. The method includes determining a phase shift of an AC output signal of the power condition and an average AC output power of the power conditioner. The average AC output power may be a predetermined value or a calculated value based on sensed or measured signals. The method further includes generating an AC signal at an energy storage device. The generated AC signal has an amplitude that is a function of the average AC output power and a phase shift substantially equal to 45 degrees minus an amount that is dependent on the determined phase shift. In some embodiments, the phase shift may be determined to be of a non-zero value.

24 Claims, 3 Drawing Sheets

U.S. PATENT DOCUMENTS

| | | |
|---|---|---|
| 4,661,758 A | 4/1987 | Whittaker |
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 5,041,959 A | 8/1991 | Walker |
| 5,148,043 A | 9/1992 | Hirata et al. |
| 5,160,851 A | 11/1992 | McAndrews |
| 5,191,519 A | 3/1993 | Kawakami |
| 5,309,073 A | 5/1994 | Kaneko et al. |
| 5,343,380 A | 8/1994 | Champlin |
| 5,473,528 A | 12/1995 | Hirata |
| 5,668,464 A | 9/1997 | Krein |
| 5,684,385 A | 11/1997 | Guyonneau et al. |
| 5,721,481 A | 2/1998 | Narita et al. |
| 5,745,356 A | 4/1998 | Tassitino |
| 5,796,182 A | 8/1998 | Martin |
| 5,801,519 A | 9/1998 | Midya et al. |
| 5,886,890 A | 3/1999 | Ishida et al. |
| 5,929,537 A | 7/1999 | Glennon |
| 5,978,236 A | 11/1999 | Faberman et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,225,708 B1 | 5/2001 | Furukawa |
| 6,268,559 B1 | 7/2001 | Yamawaki |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 7,031,176 B2 | 4/2006 | Kotsopoulos et al. |
| 7,072,195 B2 | 7/2006 | Xu |
| 7,091,707 B2 | 8/2006 | Cutler |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 | 3/2008 | Jepsen et al. |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,646,116 B2 | 1/2010 | Batarseh et al. |
| 7,660,139 B2 | 2/2010 | Garabandic |
| 7,667,610 B2 | 2/2010 | Thompson |
| 7,710,752 B2 | 5/2010 | West |
| 7,733,679 B2 | 6/2010 | Luger et al. |
| 7,755,916 B2 * | 7/2010 | Krein et al. .................. 363/39 |
| 7,768,155 B2 | 8/2010 | Fornage |
| 7,796,412 B2 | 9/2010 | Fornage |
| RE41,965 E | 11/2010 | West |
| 7,839,022 B2 | 11/2010 | Wolfs |
| 7,855,906 B2 | 12/2010 | Klodowski et al. |
| 7,859,230 B2 * | 12/2010 | Rozman et al. .................. 322/46 |
| RE42,039 E | 1/2011 | West et al. |
| 7,899,632 B2 | 3/2011 | Fornage et al. |
| 7,916,505 B2 | 3/2011 | Fornage |
| 2001/0043050 A1 | 11/2001 | Fisher |
| 2002/0017822 A1 | 2/2002 | Umemura et al. |
| 2002/0196026 A1 | 12/2002 | Kimura et al. |
| 2005/0213272 A1 | 9/2005 | Kobayashi |
| 2006/0067137 A1 | 3/2006 | Udrea et al. |
| 2006/0083039 A1 | 4/2006 | Oliveira et al. |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0221267 A1 | 9/2007 | Fornage |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |
| 2009/0296348 A1 | 12/2009 | Russell et al. |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0139945 A1 | 6/2010 | Dargatz |
| 2010/0142236 A1 * | 6/2010 | Lee et al. .................. 363/74 |
| 2010/0175338 A1 | 7/2010 | Garcia Cors |
| 2010/0176771 A1 | 7/2010 | Fieldhouse et al. |
| 2010/0181830 A1 | 7/2010 | Fornage et al. |
| 2010/0195357 A1 | 8/2010 | Fornage et al. |
| 2010/0214808 A1 | 8/2010 | Rodriguez |
| 2010/0222933 A1 | 9/2010 | Smith et al. |
| 2010/0236612 A1 | 9/2010 | Khajehoddin et al. |
| 2010/0263704 A1 | 10/2010 | Fornage et al. |
| 2010/0283325 A1 | 11/2010 | Marcianesi et al. |
| 2010/0309695 A1 | 12/2010 | Fornage |
| 2011/0012429 A1 | 1/2011 | Fornage |
| 2011/0019444 A1 | 1/2011 | Dargatz et al. |
| 2011/0026281 A1 | 2/2011 | Chapman et al. |
| 2011/0026282 A1 | 2/2011 | Chapman et al. |
| 2011/0043160 A1 | 2/2011 | Serban |
| 2011/0049990 A1 | 3/2011 | Amaratunga et al. |
| 2011/0051820 A1 | 3/2011 | Fornage |
| 2011/0130889 A1 | 6/2011 | Khajehoddin et al. |

FOREIGN PATENT DOCUMENTS

| | | |
|---|---|---|
| CA | 2655007 A1 | 8/2010 |
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | WO 2004008619 A2 | 1/2004 |
| WO | WO 2004100348 A1 | 11/2004 |
| WO | WO 2004100348 A8 | 12/2005 |
| WO | WO 2006048688 A1 | 5/2006 |
| WO | WO 2007080429 A2 | 7/2007 |
| WO | WO 2009081205 A2 | 7/2009 |
| WO | WO 2009081205 A3 | 10/2009 |
| WO | WO 2009134756 A1 | 11/2009 |

OTHER PUBLICATIONS

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol. 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Bush, "UK Solar Firm Discloses Novel Inverter Topology," ElectronicsWeekly.com. Apr. 2011, last accessed Aug. 30, 2011 at http://www.electronicsweekly.com/Articles/2011/04/26/50953/UK-solar-firm-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliam College, Cambridge, 173 pages, 2007.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved 2kw Solar Inverter With Wide Input Voltage Range," IEEE 10th Mediterranean Conference, MEleCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings-Circuits, Devices and Systems, pp. 279-286, 2001.

Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.

Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.

Jeong et al., "An Improved Method for Anti-Islanding by Reactive Power Control," pp. 965-970, 2005.

Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.

Jung et al., "High-frequency DC Link Inverter for Grid-Connected Photovoltaic System," Conference Record of the Twenty-Ninth IEEE Photovoltaic Specialists Conference, pp. 1410-1413, 2002.

Kern, "SunSine300: Manufacture of an AC Photovoltaic Module, Final Report, Phases I & II, Jul. 25, 1995-Jun. 30, 1998," NREL/SR-520-26085, 1999, 32 pages.

Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.

Khajehoddin et al., "A Novel Topology and Control Strategy for Maximum Power Point Trackers and Multi-string Grid-connected PV Inverters," Applied Power Electronics Conference, APEC08, pp. 173-178, 2008.

Khajehoddin et al., "A Robust Power Decoupler and Maximum Power Point Tracker Topology for a Grid-Connected Photovoltaic System," IEEE Power Electronics Specialists Conference, PESC08, pp. 66-69, 2008.

Kim et al., "New Control Scheme for AC-DC-AC Converter Without DC Link Electrolytic Capacitor," 24th Annual IEEE Power Electronics Specialists Conference, PESC '93 Record., pp. 300-306, 1993.

Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected Inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the PHOTOENERGY™ Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

Kutkut, "PV Energy Conversion and System Integration," Florida Energy Systems Consortium, 2009, 24 pages.

Kwon et al., "High-efficiency Module-integrated Photovoltaic Power Conditioning System," IET Power Electronics, doi: 10.1049/iet-pel. 2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

Nikraz et al., "Digital Control of a Voltage Source Inverter in Photovoltaic Applications," 35th Annual IEEE Power Electronics Specialists Conference, pp. 3266-3271, 2004.

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 31, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-to-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp 1658-1663, 2002.

Takahashi et al., "Development of Long Life Three Phase Uninterruptible Power Supply Using Flywheel Energy Storage Unit," Proc. Int'l Conf. Power Electronics, vol. 1, pp. 559-564, 1996.

Takahashi et al., "Electrolytic Capacitor-Less PWM Inverter", in Proceedings of the IPEC '90, Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A 1 Φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A 1 Φ 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

* cited by examiner

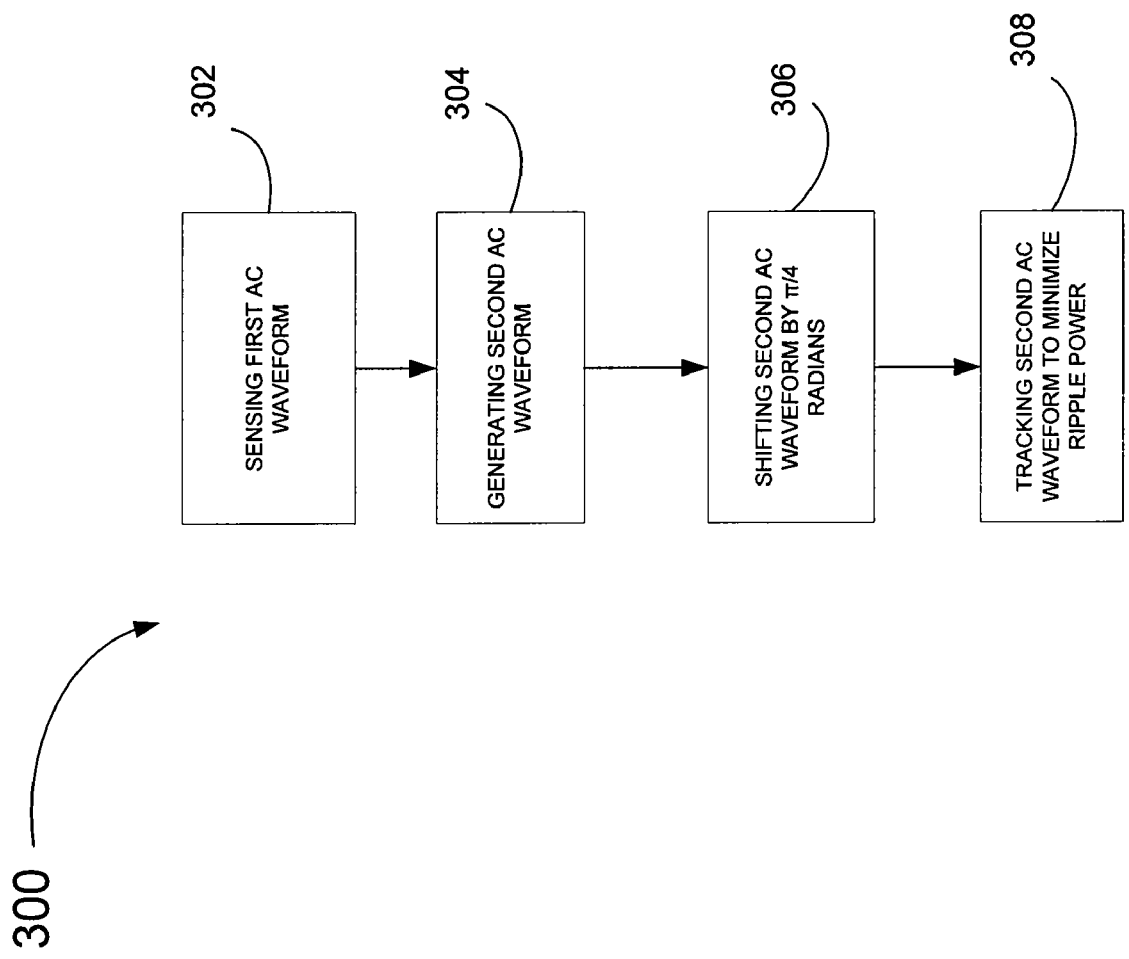

METHODS FOR MINIMIZING DOUBLE-FREQUENCY RIPPLE POWER IN SINGLE-PHASE POWER CONDITIONERS

CROSS-REFERENCE TO RELATED U.S. PATENT APPLICATION

This application is a continuation application of U.S. application Ser. No. 12/794,034, entitled "METHODS FOR MINIMIZING DOUBLE-FREQUENCY RIPPLE POWER IN SINGLE-PHASE POWER CONDITIONERS," which was filed on Jun. 4, 2010 and which is a continuation application of U.S. application Ser. No. 11/871,015, now U.S. Pat. No. 7,755,916, entitled "METHODS FOR MINIMIZING DOUBLE-FREQUENCY RIPPLE POWER IN SINGLE-PHASE POWER CONDITIONERS," which was filed on Oct. 11, 2007, the entirety of both of which is hereby incorporated by reference.

FIELD

The invention relates, generally, to ripple power cancellation in switching power conditioners and, more particularly, to a method for minimizing double-frequency ripple power exchanged between an AC load and an DC energy source through a single-phase AC power conditioner.

BACKGROUND

Many alternative energy sources deliver an approximately constant electrical power over short periods of time which can vary over longer durations based on operating conditions, such as solar energy availability for photovoltaic cells or fuel-supply-based output power from fuel cells. Alternative energy sources include solar panels and fuel cells, which produce power with direct-current (DC), and wind or other rotating or reciprocating generation systems that usually produce power at variable frequency then use a rectifier to produce DC power for power conditioning. This DC electrical power is processed through a power conditioner, generally for conversion to sinusoidal alternating-current (AC) power at fixed frequency, either for delivery to a conventional electricity grid or directly to a load for "off-grid" applications. Typical conversion systems utilized in residences or small businesses generate single-phase AC power, with sinusoidal voltage and current at a fixed nominal frequency.

A basic electrical property of a single-phase AC power system is that the energy flow includes both an average power portion that delivers useful energy from the energy source to the load and a double-frequency portion that flows back and forth between the load and the source. The double-frequency portion represents undesirable ripple power that can compromise performance of the DC power source. Power conditioners for alternative energy systems preferably draw power from the source at the input of the power conditioner without ripple, and in turn deliver both average power and the double-frequency ripple power to the AC load at the electrical output. The conservation of energy principle requires that there exists some physical effect inside the power conditioner to manage this double-frequency ripple power.

Typically, power conditioners used for DC energy sources such as photovoltaic and fuel cells are configured as DC-to-AC converters, and are often referred to as inverters. Practical inverters for single-phase alternative energy systems include filters to manage double-frequency ripple power. The filters are configured to allow double-frequency ripple power to flow at the AC output of the inverter, while minimizing or preventing similar ripple power from flowing back to the DC energy source or otherwise being imposed on the DC energy source.

To manage double-frequency ripple power, energy needs to be stored and delivered at twice the AC frequency. The electrical components needed to store the needed energy are generally large and are well known to be the least reliable components in power inverters. A typical energy storage component is a large electrolytic capacitor, which has well-known failure and wear-out modes that prevent reliable operation over a long lifespan. A typical electrolytic capacitor might have a nameplate rating of 2,000 hours (less than 7 months in a typical solar inverter application) of operation at its maximum temperature and voltage. Since inverters need to operate for longer durations, expensive derating methods, such as those based on the Arrhenius equation, typically limit the operating temperature and operating voltage in order to extend the device lifetime. Still, today's state-of-the-art derating and production methods, well known to one skilled in the art, support inverter warranties of only about 5 years, as observed in the marketplace. Longer warranties usually assume that the electrolytic capacitors will be replaced during the inverter lifetime.

Solar inverters, when rated for outdoor use and co-packaged with the solar panels, often operate at elevated temperatures which accelerate the failure modes and shortens the lifetime of electrolytic capacitors mounted in the inverter. Even though the inverters only run during the part of each day the sun shines, thermal stress prevents the inverters from lasting twenty-five years or more—in contrast to solar panels which often have warranties of 25 or more years. Indeed, manufacturers of inverters for solar power have stated categorically that 20 year inverter life is not possible, largely because of this component issue.

As electrolytic capacitors are well known to be the most significant limitation to power inverter reliability, expectations for poor reliability are evident in the market place: high-power inverters are designed to have replaceable (field serviceable) electrolytic capacitors, new lower-power inverter designs feature easily removable inverter electronics to facilitate repair or replacement, and service contracts are routinely sold with inverters in some markets. While electrolytic capacitors have many failure modes, a major wear-out mechanism is that ripple current causes self-heating which in turn reduces life. Since self-heating is from within, the actual core temperature is higher than the ambient, limiting the effectiveness of active cooling techniques. A typical solution is to use capacitors rated at 105° C. in place of more common 85° C. capacitors but they add 20% to 50% more to the cost and are an incomplete solution.

Many commercially available inverters manage the double-frequency ripple power by using passive filtering in the form of an electrolytic capacitor which is applied at a DC bus where the double-frequency power term translates into ripple on the capacitor. This passive filtering arrangement requires a large capacitance value to filter the double-frequency power, since the necessary energy exchange needs to be supported without imposing significant voltage ripple. Further, since the capacitor maintains a relatively constant voltage, the capacitor current needs to flow at the double-frequency.

In the research community, active filtering circuits are being explored as a more effective alternative to the passive methods. In active filter approaches, ripple current is supplied through a separate power converter. In one common approach, a capacitor is used to maintain a relatively fixed voltage at a separate location within the power conditioner, a so called "internal DC bus." A controller injects a compensating current from this capacitor into the inverter circuit to cancel out the double-frequency ripple power. Since the voltage is held approximately fixed, the compensating current is injected at double the AC line frequency. A typical example injects this compensating current at the terminals of photovoltaic (PV) array.

The active filter method provides two advantages over passive approaches: (1) the capacitor voltage can be higher than the voltage of the PV array, increasing the available energy, and (2) more ripple power can be tolerated on the capacitor than on the PV array. The required capacitance has been shown to be:

$$C = \frac{P}{2\pi f V \Delta V}$$

where P is the average output power, f is the fundamental grid frequency, V is the average capacitor voltage, and ΔV is the allowed peak-to-peak ripple voltage. This method leads to significant capacitance reduction over passive filter approaches. For example, a 1 kW inverter with a 200V capacitor bus voltage requires only about 440 µF if 15% ripple is allowed on the capacitor. This is a factor of almost 20 reduction over passive filtering, but is still high enough to require large electrolytic capacitors.

Therefore, a need exists for a control technique that minimizes double-frequency ripple power in power conditioners, removes the need for large electrolytic capacitors, increases the lifespan of power conditioners, reduces cost and overcomes other problems previously experienced. These and other needs will become apparent to those of skill in the art after reading the present specification.

SUMMARY

The foregoing problems are solved and a technical advance is achieved by the present invention. Articles of manufacture and systems consistent with the present invention provide a method for minimizing double frequency ripple power in power conditioners.

A method is provided for minimizing a double frequency ripple power exchanged between a load and an energy source, the energy source delivering electrical power to the load through a single-phase power conditioner, and the power conditioner being coupled to an energy storage device. The method senses a first AC waveform at the output of the power conditioner, as delivered to the load (or to a single-phase power grid). The method then generates a second AC waveform to be applied to the energy storage device such that the double-frequency ripple power is minimized when the power delivered to the AC load and the energy storage device are added. The generated second AC waveform has the same frequency as the first AC waveform, and is shifted by a phase shift equal to π/4 radians relatively to the AC waveform at the power conditioner output. These choices of frequency and phase, along with the appropriate choice of amplitude, minimize the double-frequency ripple power imposed on the DC energy source.

In one aspect of the invention, the energy storage device is coupled to the power conditioner through an interface which controls a desirable flow of electrical power into and out of the energy storage device.

In another aspect, the second AC waveform is created by alternatively conducting and blocking the flow of power from the energy storage device to the power conditioner. That is, the second AC waveform is approximately generated through switching action, as is well known to those skilled in the art of power electronics.

In another advantageous aspect, a third AC waveform can be used at the energy storage device to minimize the double frequency ripple power imposed on the DC energy source. This third AC waveform is suitably formed as a piecewise combination of the second AC waveform and its inverse. Advantageously, the third AC waveform can be selected to maintain either positive voltage or positive current on the energy storage device at all times.

An apparatus to implement the method of the invention is provided in the form of a single-phase power conditioner in which the conditioner draws energy from a DC energy source, delivers an AC waveform to an output, and receives a second AC waveform from an energy storage device. The apparatus comprises a sensing unit for sensing a first AC waveform at the output of the power conditioner, and a controlling unit for generating a second AC waveform at the energy storage device, the second AC waveform having the same frequency as the first AC waveform, and for shifting the second AC waveform by a phase shift equal to π/4 radians relative to a phase of the first AC waveform, thereby minimizing the double-frequency ripple power in the power supplied by the energy source.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF DRAWINGS

The accompanying drawings, which are incorporated in and constitute a part of this specification, illustrate an implementation of the present invention and, together with the description, serve to explain the advantages and principles of the invention. In the drawings:

FIG. 3 is a flow chart illustrating a control method for minimizing double-frequency ripple power in the power conditioner consistent with the present invention.

DETAILED DESCRIPTION OF DRAWINGS

Reference will now be made in detail to an implementation consistent with the present invention as illustrated in the accompanying drawings. Wherever possible, the same reference numbers will be used throughout the drawings and the following description to refer to the same or like parts.

Figure 1:
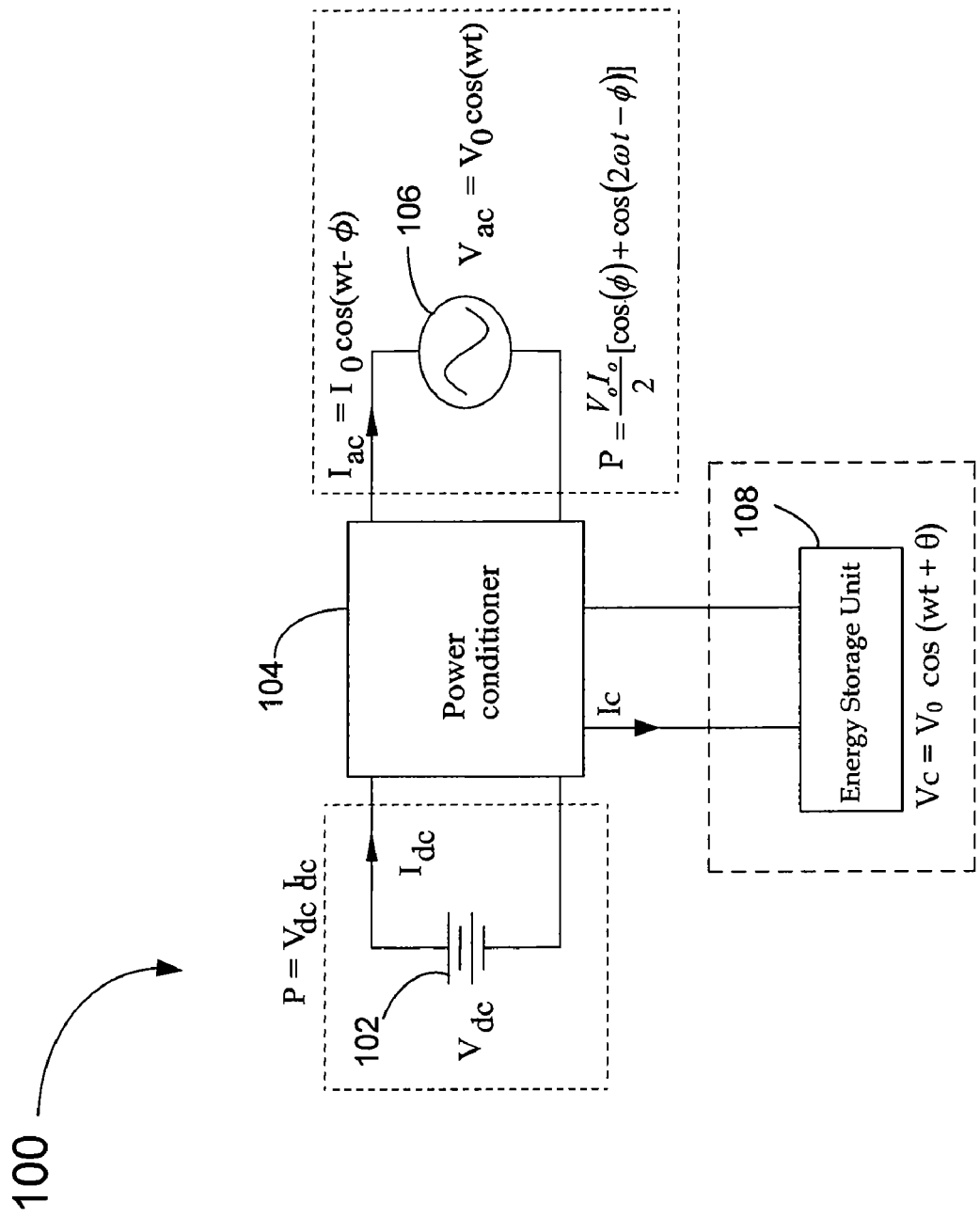
FIG. 1 is a schematic diagram illustrating one embodiment of a power system including a DC energy source connected to an electric AC grid via a single-phase power conditioner, and an energy storage unit consistent with the present invention.

FIG. 1 depicts one embodiment of a single-phase ac power system 100, which includes an energy source unit 102, and a power conditioner 104 which are connected to a single-phase AC load 106 and an energy storage unit 108. The AC load 106 may also be a single-phase connection to the utility power grid. The source unit 102 may be any kind of DC power or DC energy generating system, such as for example a solar panel, solar cell, fuel cell, a wind or rotary generator with a rectifier. The energy storage 108 can be a capacitor, and inductor, an ultra-capacitor or the like. A control integral to the power conditioner 104 can draw maximum power from the energy source 102 whenever power is available and useful. The control acts to maintain operation at an optimum power point, selected for the specific energy source technology. The power conditioner 104 may be a switching power converter, a power inverter and the like. The power conditioner 104 may include a processor programmed with operational instructions.

As stated above, in this single-phase AC power system 100 the energy flow includes both an average power portion that delivers useful energy from the DC energy source 102 to the AC load 106 and a double-frequency portion that flows back and forth between the AC load 106 and the DC source 102. The double-frequency portion represents undesirable ripple power that can compromise performance of the power conditioner 104.

Figure 2:
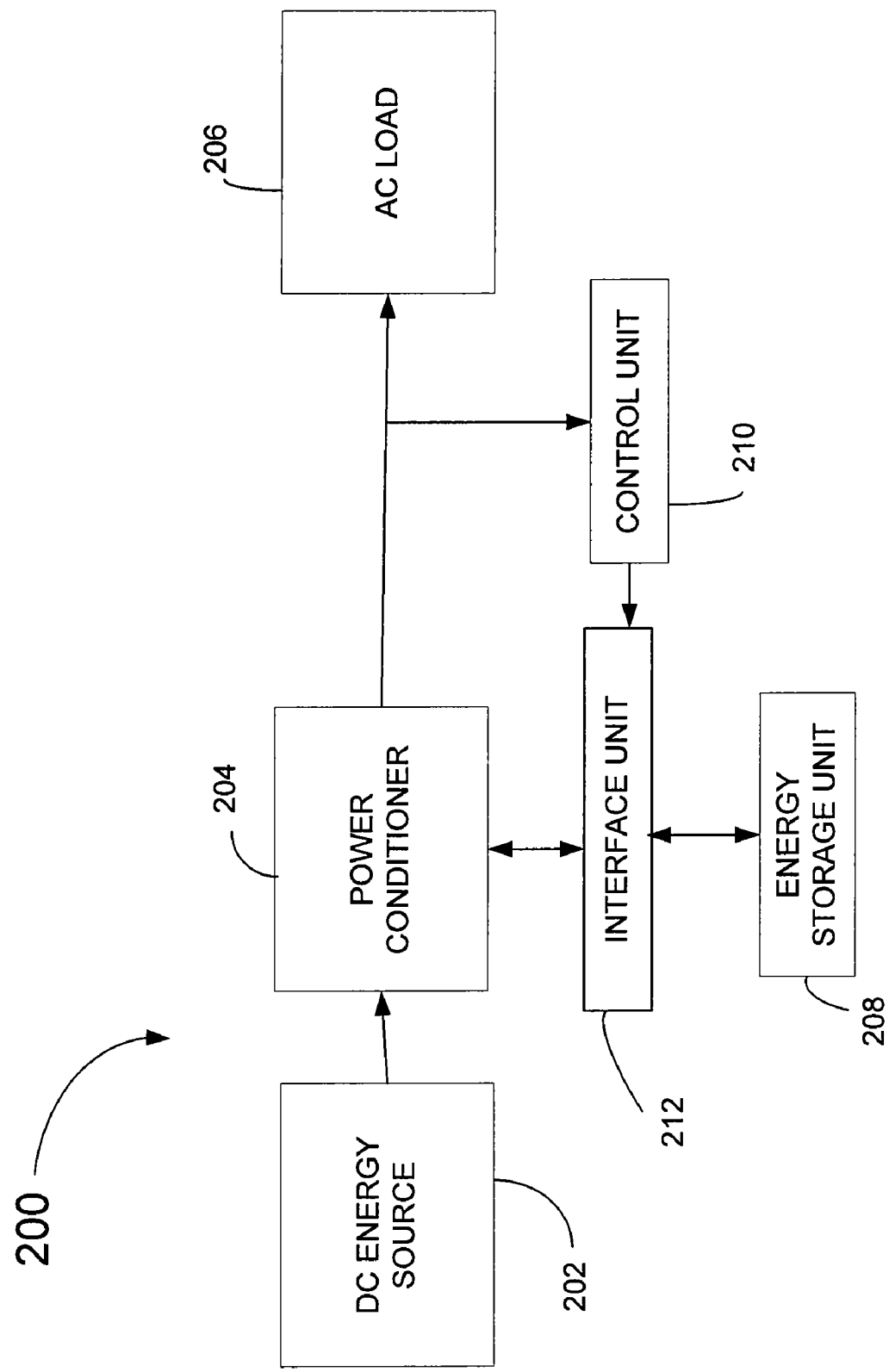
FIG. 2 is a block diagram illustrating the energy storage unit of FIG. 1 coupled to the power conditioner via an interface unit for managing double-frequency ripple power consistent with the present invention.

Now referring to FIG. 2, the energy storage unit 208 is coupled to a control unit 210. To manage this double-frequency ripple power, the coupling of the energy storage unit 208 and the control unit 210 is configured to provide a sinusoidal compensation to the ripple power exchanged between the load 206 and the energy source 202. An interface unit 212, which couples the power conditioner 204 to the energy storage unit 208, is configured to control the flow of electrical energy into and out of the energy storage unit 208. Alternately, the interface unit 212 may be integrated with the power conditioner 204 or with the energy storage unit 208. Alternately, the interface unit 212 and energy storage unit 208 may be integrated with the power conditioner 204. The control unit 210 may be integral to the interface unit 212, which may be a power converter, power inverter, or the like.

To minimize the capacitance needed for double-frequency ripple power, it is vital to use the full range of a capacitor's energy storage. This also applies if inductors or other energy storage devices are being used: all available capacity needs to be employed if the smallest components or capacitor values are to be employed. The requirements are readily computed, and equivalent computations for inductors have been presented in the literature. Consider a single-phase application with an average output power $P_O$ and AC frequency $\omega=2\pi f$. Ignoring for the moment any phase shift between current and voltage, the instantaneous AC output power from the power conditioner 204 to the AC load 206 is:

$$p_O(t) = P_O + P_O \cos(2\omega t)$$ Equation 1

Without loss of generality, only the average portion, $P_O$, of the output power is supplied by the energy source 202. Thus, the storage unit 208 is required to supply the double-frequency term, $P_O \cos(2\omega t)$ whenever $p_O(t) > P_O$ and store the double frequency term whenever $p_O(t) < P_O$. The required energy storage capacity to store and deliver the ripple power is the time integral of the double-frequency ripple power:

$$W = \int_{t1}^{t2} P_o \cos(2\omega s) ds$$ Equation 2

Where $t_1$ and $t_2$ define a half-period of the double-frequency ripple and satisfy $p_O(t) = P_O$ such that $$t_1 < t_2 < t_1 + \frac{\pi}{\omega}$$

during which time energy in the energy storage unit 208 is either being stored or supplied.

Therefore, the stored energy required during a period of the double-frequency ripple is equal to:

$$P_O/\omega \text{ or } P_O/(2\pi f)$$ Equation 3

In a 60 Hz system, the energy requirement in joules is 0.00265 times the average power in watts. For a 100 W converter, the energy storage requirement is 0.265 J, while for a 1 kW inverter, the requirement is 2.65 J. The instantaneous energy stored follows a sinusoidal waveform at 120 Hz, or twice the fundamental AC frequency, even though the voltage and the current waveforms on the capacitor are both oscillating at the fundamental 60 Hz AC frequency.

In an embodiment of the invention where a capacitor is used as the energy storage device 208, the energy storage requirement translates into a capacitor requirement. By definition, a capacitor stores energy according to:

$$W = \frac{1}{2}CV^2$$ Equation 4

A given peak capacitor voltage and the required energy determines the required capacitor, assuming that the voltage is adjusted over time to follow the necessary energy waveform.

Further, the power conditioner 204 can produce a single-phase sinusoidal voltage $V_{ac}(t)$ such that:

$$v_{ac}(t) = V_O \cos(\omega t)$$ Equation 5 as in FIG. 1. The current delivered to the single-phase electrical load 206 has, in general, a phase shift, and takes the following form:

$$i_{ac}(t) = I_O \cos(\omega t + \theta)$$ Equation 6

As such, the output power into the AC load 206 is:

$$p_o(t) = \frac{V_o I_o}{2}\cos(\phi) + \frac{V_o I_o}{2}\cos(2\omega t - \phi)$$ Equation 7

Turning our attention to the energy storage unit 208, the corresponding capacitor voltage can be controlled to follow a waveform as follows:

$$v_C(t) = V_C \cos(\omega t + \theta)$$ Equation 8 and the corresponding capacitor current is proportional to the time derivative of capacitor voltage:

$$i_c(t) = C\frac{dv_c(t)}{dt}$$ Equation 9

As such, the instantaneous capacitor power $p_c(t)$ is:

$$p_c(t) = -\frac{\omega C V_c^2}{2}\sin(2\omega t + 2\theta)$$ Equation 10

Additionally, the capacitor power can be made equal to the double-frequency ripple power so that the sum of the output power of the power conditioner and the capacitor power contains only the average portion of the load power. The required relationship is:

$$\frac{\omega C V_c^2}{2}\sin(2\omega t + 2\theta) = P_o\cos(2\omega t - \phi) \qquad \text{Equation 11}$$

where $P_o$ is the average power supplied to the load.

Appropriate values for $V_c$ and $\theta$ are selected such that the sum of power delivered by the energy source unit 202 and by the capacitor-based energy storage device 208 exactly equals the power supplied to the load $P_o(t)$. From appropriate trigonometric identities, it can be shown that this equality is satisfied when:

$$\frac{\omega C V_c^2}{2} = P_o \text{ and } \theta = \frac{\pi}{4} - \frac{\phi}{2} \qquad \text{Equation 12}$$

This means that if a controlled voltage at the same frequency as the AC line can be delivered to the capacitor of the energy storage unit 208, a phase shift given in terms of $\theta$ as above can completely offset the double-frequency ripple power and yield the necessary result. Advantageously, the double-frequency ripple is offset using the minimum amount of capacitance, i.e. the smallest capacitors, which enables the use of more reliable devices such as film capacitors. For example, a 100 W inverter requires an energy storage or capacitance of 26.5 μF if the peak capacitor voltage is 100 V and the correct phase is applied.

A typical single-phase grid-connected solar energy inverter delivers current to the grid without phase shift (unity power factor), in which case $\phi=0$. The phase need for the capacitor voltage is readily found to be $\theta=45°$. The actual time-varying voltage to the capacitor of the energy storage unit 208 can be controlled by any convenient means, such as with pulse-width modulation (PWM). In one embodiment, the energy storage unit 208 can be operated with a separate inverter that operates from its own voltage so as to operate at the desired the peak value $V_c$. The PWM process yields time-varying control of the actual voltage imposed on the capacitor of the energy storage unit 208. The PWM process can be controlled to impose an effective voltage value;

$$v_c(t) = \sqrt{\frac{2P_o}{\omega C}} \cos\left(\omega t + \frac{\pi}{4} - \frac{\phi}{2}\right) \qquad \text{Equation 13}$$

on the capacitor of the energy storage unit 208, provided its separate inverter operates from voltage $V_1$ sufficient to make:

$$V_1 \geq \sqrt{\frac{2P_o}{\omega C}} \qquad \text{Equation 14}$$

Although these expressions contain square roots, the terms under the radical are known parameters, and the power level is predetermined by the capacity of the energy source 202. The radical does not involve rapid time varying functions, and implementation is easy.

The last expression also allows a designer to specify the capacitor value. For example, in a 60 Hz system with 100 W rating, a capacitor of 5 μF can be used if peak voltage of 326 V is available. A capacitor of 2 μF can be employed if the peak voltage exceeds 515 V.

It is significant to point out that a voltage given by the following:

$$v_C(t) = |V_C \cos(\omega t + \theta)| \qquad \text{Equation 15}$$

yields exactly the same set of results. It produces the same instantaneous power and the same requirements for $\theta$ and $V_1$. It is also useful to recognize that a minimum inductor and the configuration requirements for an inductor-based filter are analogous to the capacitor. To show this, consider that a purely inductive filter could also be driven with an applied current:

$$i_L(t) = I_L \cos(\omega t + \theta) \qquad \text{Equation 16}$$

Following the treatment above, this will deliver the correct instantaneous power to cancel the variation if:

$$\frac{\omega L I_L^2}{2} = P_o \text{ and } \theta = \frac{\pi}{4} - \frac{\phi}{2} \qquad \text{Equation 17}$$

It is apparent to one skilled in the art that a capacitor driven with a current waveform or an inductor driven with a voltage waveform will yield an alternate solution. For the capacitor of the energy storage unit 208, the following current is applied:

$$i_C(t) = I_C \cos(\omega t + \theta) \qquad \text{Equation 18}$$

Then the instantaneous ripple power is delivered when:

$$\frac{I_c^2}{2\omega C} = P_o \text{ and } \theta = -\frac{\pi}{4} - \frac{\phi}{2} \qquad \text{Equation 19}$$

As in the voltage case, this current can be controlled by means of a PWM process or other suitable method.

Furthermore, combinations of inductors and capacitors are possible. These combinations can alter the required values of L, C, and $\theta$, but the underlying analysis is still valid and can be used to compute the necessary values.

In the discussion above, a specific time-varying voltage, at the same frequency as the AC output, is imposed on the energy storage unit 208 to deliver double-frequency ripple power to its output. The analysis shows that the results lead to the minimum required values of capacitance. The required voltage can be imposed by any suitable method, but an especially advantageous approach is to use a low-loss switching power converter to deliver the voltage. The voltage in turn can be adjusted by means of well-known PWM inverter control processes.

In the single-phase grid-connected power conditioner 204, the phase shift $\phi$ is subject to control. For given parameter values for system frequency and capacitance, the only unknown quantity is the average input power $P_0$. This power can be sensed at the output, or it can be treated as the actual commanded power flowing from the solar cells. The implications are that two possible control modes are available. In the first, the value of $P_0$ is treated as an external, known, given value. The proper time-varying voltage or current to be applied is readily computed from this and other known parameters, and is then imposed on the capacitor or inductor. This represents a feed-forward active filter technique. In the second control mode, the power is sensed at the output of the power conditioner 204, either on average or by sensing and multiplication of the measured voltage and current. The time-varying waveform to be imposed on the energy storage unit 208 is generated by means of a 45° phase shift from a waveform half-way between the current and voltage (to yield the angle $\phi/2$). This, in effect, represents a feedback active filter method, a relative conventional implementation approach, even though in this case the actual current or voltage to be delivered is unconventional.

Now referring to FIG. 3, a flow chart 300 illustrating a method for minimizing double-frequency ripple power in the power system 100 is shown. This method begins at step 302 where the system 100 senses a first AC waveform at the output of the power conditioner 204. The method then proceeds to step 304, where a second AC waveform is generated at the energy storage unit 208, the second AC waveform having the same frequency as the first AC waveform. At step 306, the second AC waveform is shifted by a phase shift equal to n/4 radians relative to a phase of the first AC waveform, thereby minimizing the double-frequency ripple power in the power supplied by the energy source 202. In step 308, the electrical energy flowing into and out of the energy storage unit 208 is controlled by appropriate switching action of the interface unit 212 to track the shifted second AC waveform, thereby compensating the double-frequency ripple power.

Therefore, an energy minimization strategy can be used to eliminate electrolytic capacitors as bulk filtering components in alternative energy power conditioners for single-phase applications. The method supports the use of either film capacitors or inductors as energy storage components. New aspects of the invention are as follows:

The demonstration that the inductor and capacitor values given by the analysis are in fact the minimum values that can also deliver the required double-frequency ripple power. The strategy presented here can be rigorously proven to yield the lowest possible energy storage requirement while still delivering all of the ripple power.

Examples of specific waveforms that must be imposed on energy storage components to deliver the desired ripple power. That is, a voltage (or current) waveform at the same frequency as the ac output is to be employed, and that an extra phase shift of 450 is involved.

Implementation of the time-varying waveform in low-loss form via PWM or other known power conversion process. While the general process of using PWM to impose a time-varying waveform is well known, the specific waveforms to be employed are not.

By using minimum-sized energy storage components and appropriate choices of current or voltage, electrolytic capacitors can be avoided.

A highly reliable power conditioner for alternative energy that can be constructed using highly reliable energy storage units.

In summary, if the full capability of energy storage units can be employed, filter components needed in single-phase power conditioners for alternative energy systems can be reduced to the minimum possible values. Once capacitor values below about 50 µL& are achieved, it becomes feasible to implement them with film capacitors at reasonable cost. This supports the elimination of electrolytic capacitors, which at present are a major reliability limiter in alternative energy systems. Film capacitors have operating lifetimes about a factor of 1000 longer than electrolytic capacitors. This leads to multi-decade operating life for typical solar inverters and other alternative energy applications.

While various embodiments of the present invention have been described, it will be apparent to those skilled in the art that many more embodiments and implementations are possible that are within the scope of this invention. Accordingly, the present invention is not to be restricted except in light of the attached claims and their equivalents.

The invention claimed is:

1. A method for reducing a double-frequency ripple power exchanged between a load and an energy source, the energy source being configured to deliver electrical output power to the load through a single-phase power conditioner, the method comprising:
   determining a first phase shift of an alternating current (AC) output signal of the power conditioner;
   determining an average AC output power of the power conditioner; and
   generating an AC signal at an energy storage device, the AC signal having (i) an amplitude that is a function of the average AC output power and (ii) a phase shift substantially equal to 45 degrees minus an amount that is dependent on the determined first phase shift.

2. The method of claim 1, wherein determining the first phase shift of the AC output signal comprises determining a first phase shift of an AC output current signal of the power conditioner.

3. The method of claim 1, wherein determining the first phase shift comprises:
   sensing an AC output voltage signal of the power conditioner;
   sensing an AC output current signal of the power conditioner; and
   determining a first phase shift based on the AC output voltage signal and the AC output current signal.

4. The method of claim 3, wherein determining the first phase shift based on the AC output voltage signal and the AC output current signal comprises determining the first phase shift of the AC output current signal relative to the AC output voltage signal.

5. The method of claim 1, wherein the first phase shift is non-zero.

6. The method of claim 1, wherein determining the average AC output power comprises setting an average AC output power value equal to a predetermined value and wherein generating the AC signal comprises generating an AC signal having an amplitude that is a function of the average AC output power value.

7. The method of claim 1, wherein determining the average AC output power comprises:
   sensing an AC output voltage signal of the power conditioner;
   sensing an AC output current signal of the power conditioner; and
   calculating the average AC output power as a function of the AC output voltage signal and the AC output current signal.

8. The method of claim 1, wherein generating the AC signal comprises generating an AC signal having a phase shift substantially equal to 45 degrees minus half of the determined first phase shift.

9. The method of claim 1, further comprising:
   calculating a phase shift adjustment by dividing the phase shift by two,
   wherein generating the AC signal comprises generating an AC signal having a phase shift substantially equal to 45 degrees minus the first phase shift adjustment.

10. The method of claim 1, wherein generating the AC signal at the energy storage device comprises generating the AC signal at one of a capacitor and an inductor.

11. The method of claim 1, wherein generating the AC signal at the energy storage device comprises generating the AC signal at an energy storage device included in the single-phase power conditioner.

12. The method of claim 1, wherein generating the AC signal comprises generating an AC signal having an amplitude dependent on the average AC output power and a capacitance of the energy storage device.

13. The method of claim 12, wherein generating the AC signal comprises generating an AC voltage signal at a capacitive energy storage device, the AC voltage signal having an amplitude substantially equal to:

$$\sqrt{\frac{2P_o}{\omega C}}$$

wherein Po is the average AC output power, ω is the frequency of the AC output signal, and C is the capacitance of the capacitive energy storage device.

14. A method for reducing a double-frequency ripple power exchanged between a load and an energy source, the energy source being configured to deliver electrical output power to the load through a single-phase power conditioner, the method comprising:
   sensing an AC output voltage signal of the power conditioner;
   sensing an AC output current signal of the power conditioner;
   determining a first phase shift of the AC output current relative to the AC output voltage signal;
   determining an average AC output power of the power conditioner as a function of the AC output voltage and the AC output current; and
   generating an AC signal at an energy storage device, the AC signal having (i) an amplitude that is a function of the average AC output power, (ii) a frequency dependent upon a frequency of the average AC output power, and (iii) a phase shift substantially equal to 45 degrees minus an amount that is dependent on the determined first phase shift.

15. The method of claim 14, wherein generating the AC signal comprises generating an AC signal having a phase shift substantially equal to 45 degrees minus half of the determined first phase shift.

16. The method of claim 14, further comprising:
   calculating a phase shift adjustment by dividing the first phase shift by two,
   wherein generating the AC signal comprises generating an AC signal having a phase shift substantially equal to 45 degrees minus the phase shift adjustment.

17. The method of claim 14, wherein the first phase shift is non-zero.

18. The method of claim 14, wherein generating the AC signal at the energy storage device comprises generating the AC signal at one of a capacitor and an inductor.

19. The method of claim 18, wherein generating the AC signal at the energy storage device comprises generating the AC signal at an energy storage device included in the single-phase power conditioner.

20. The method of claim 14, wherein generating the AC signal comprises generating an AC signal having a frequency that is double the frequency of the average AC output power.

21. A method for reducing a double-frequency ripple power exchanged between a load and an energy source, the energy source being configured to deliver electrical output power to the load through a single-phase power conditioner, the method comprising:
   determining a first phase shift of an AC output signal of the power conditioner;
   determining an average AC output power of the power conditioner;
   determining a first AC waveform having (i) an amplitude that is a function of the average AC output and (ii) a phase shift substantially equal to 45 degrees minus an amount that is dependent on the determined first phase shift; and
   generating a second AC signal at an energy storage device, the AC second signal having a form that is a piecewise combination of the first AC waveform and an inverse of the first AC waveform.

22. The method of claim 21, wherein determining the first AC waveform comprises determining a first AC waveform having a phase shift substantially equal to 45 degrees minus half of the determined first phase shift.

23. The method of claim 21, generating the second AC signal comprises generating a second AC signal at a capacitive energy storage device, the second AC signal having a voltage determined according to the following equation:

$$V_C(t)=ABS[V_C*\cos(\omega t+\theta)]$$

wherein $V_C$ is the voltage of the second AC signal, ABS is an absolute value function, ω is the frequency of the AC output signal, and θ is the phase shift.

24. The method of claim 21, generating the second AC signal comprises generating a second AC signal at an inductive energy storage device, the second AC signal having a current determined according to the following equation:

$$I_L(t)=ABS[I_L*\cos(\omega t+\theta)]$$

wherein $I_L$ is the current of the second AC signal, ABS is an absolute value function, ω is the frequency of the AC output signal, and θ is the phase shift.

* * * * *